United States Patent [19]

Koslosky et al.

[11] Patent Number: 4,472,761
[45] Date of Patent: Sep. 18, 1984

[54] SEGMENTED ELECTRICAL PANELBOARD FOR INDUSTRIAL FRAME AND RESIDENTIAL FRAME CIRCUIT BREAKERS WHICH ACCEPTS RESIDENTIAL FRAME CIRCUIT BREAKERS AT ANY SEGMENT

[75] Inventors: Howard E. Koslosky, Milwaukee; George Greger, Waukesha, both of Wis.

[73] Assignee: Eaton Corporation, Cleveland, Ohio

[21] Appl. No.: 389,996

[22] Filed: Jun. 18, 1982

[51] Int. Cl.$^3$ ............................................. H02B 1/04
[52] U.S. Cl. ................................... 361/355; 361/361; 361/376; 339/22 B
[58] Field of Search ................. 174/16 B, 70 B, 71 B, 174/99 B, 129 B; 361/346, 355, 356, 358, 361, 363, 376, 379; 339/22 B, 198 N

[56] References Cited

U.S. PATENT DOCUMENTS

| | | | |
|---|---|---|---|
| Re. 26,737 | 12/1969 | Jorgensen et al. | 317/119 |
| 2,942,157 | 6/1960 | Davis | 317/119 |
| 3,192,446 | 6/1965 | Meacham | 317/119 |
| 3,743,892 | 7/1973 | Fritz | 361/363 |
| 3,787,713 | 1/1974 | Diersing et al. | 317/119 |
| 3,848,161 | 11/1974 | Clement | 317/119 |
| 4,093,970 | 6/1978 | M'Sadoques et al. | 361/361 |
| 4,205,892 | 6/1980 | Clement | 361/363 |
| 4,358,815 | 11/1982 | Koslosky | 361/355 |

*Primary Examiner*—G. P. Tolin
*Attorney, Agent, or Firm*—C. H. Grace; L. G. Vande Zande

[57] ABSTRACT

A panelboard (2) is divided into segments for three-pole industrial frame circuit breakers (30,46). Bus bars (A,B,C) in each segment have two sets of mountng holes (18,20,22; 20,24,26,28) for replaceably receiving branch circuit connectors (34,36,38; 42,44; 58,60) for either industrial or residential frame circuit breakers, thereby enabling residential frame circuit breakers (52,54) to be installed at any segment. A dead front cover (68) having a single opening (72) encompassing all segments, and kits comprising branch circuit connectors, insulating barriers (62) and filler plates (76,78,80,84,86,88) provide complete flexibility to the circuit breaker arrangement. An auxiliary main circuit breaker (96) kit enables the panelboard to be readily converted from a lug main to a breaker main panelboard.

19 Claims, 6 Drawing Figures

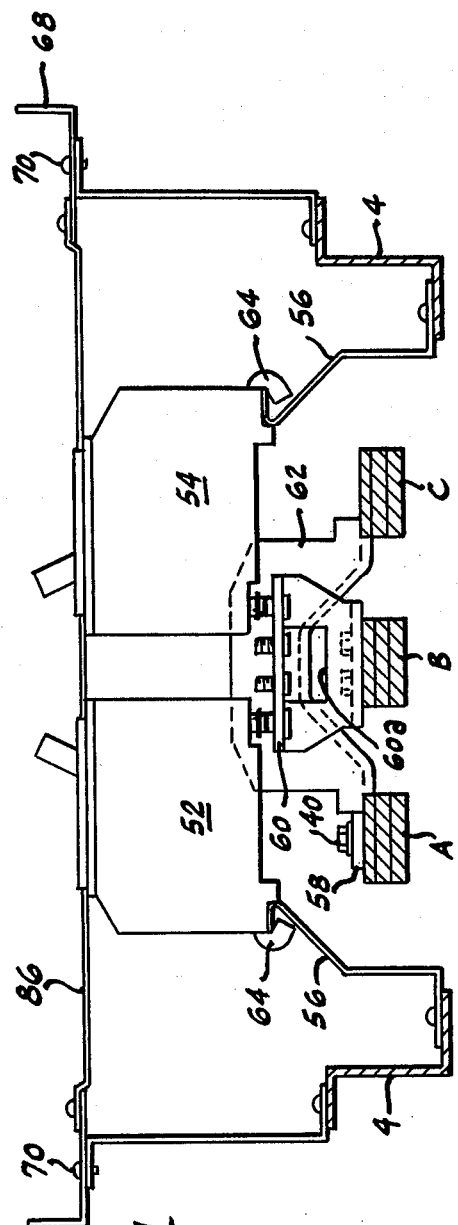
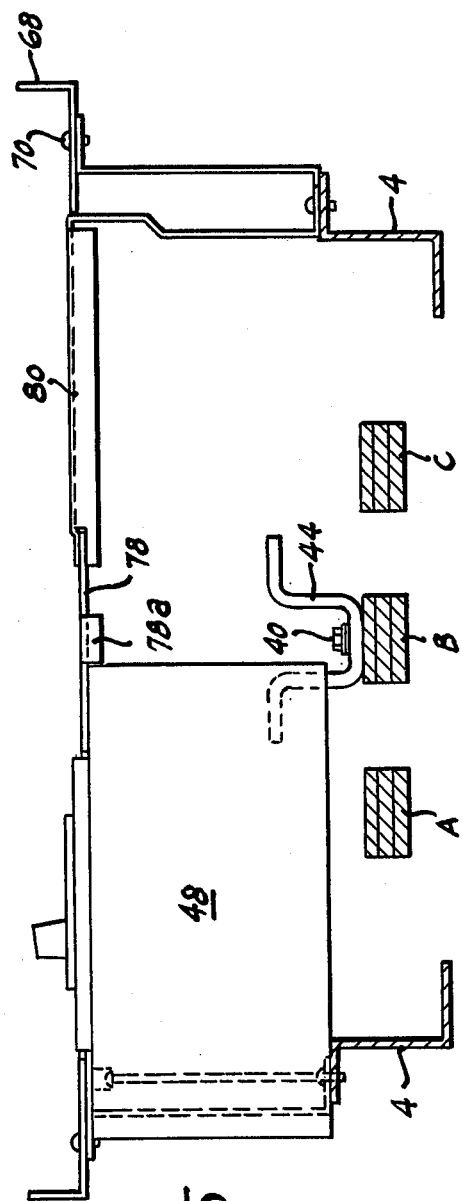

SEGMENTED ELECTRICAL PANELBOARD FOR INDUSTRIAL FRAME AND RESIDENTIAL FRAME CIRCUIT BREAKERS WHICH ACCEPTS RESIDENTIAL FRAME CIRCUIT BREAKERS AT ANY SEGMENT

BACKGROUND OF THE INVENTION

Panelboards have been known heretofore which accept circuit breakers of various pole widths and frames in intermixed arrangements. For example, a panelboard may have a plurality of single-, two- and three-pole industrial frame breakers mounted thereon in varying arrangements, the industrial frame breakers having by example a 1⅜ inch pole-to-pole spacing. Where it is desired to include branch lighting circuits using residential frame circuit breakers having for example ¾ inch pole-to-pole spacing on the same panelboard, it has been a common practice to provide a separate residential frame lighting circuit panel attached in series above or below the larger industrial frame panel. This arrangement generally restricts the location on the panelboard of the smaller residential frame circuit breakers to be all in one area which restricts flexibility for the later addition of breakers of a different size to the panelboard. In some instances, industrial frame panelboards have incorporated specific branch circuit connectors which directly convert that panelboard to branch lighting circuit capabilities, but the dead front or cover structure for the panelboard dictates that the smaller residential frame circuit breakers also be collectively located in a common area on the panelboard.

SUMMARY OF THE INVENTION

This invention provides a panelboard capable of accepting industrial frame circuit breakers and residential frame branch lighting circuit breakers which have a smaller pole width, or pole-to-pole spacing on the same panelboard, with the advantage that the residential frame circuit breakers may be incorporated at any of several predetermined positions on the panelboard. This is accomplished by segmenting the panelboard, providing a single, large opening in the dead front, or cover, and by providing kits which include mounting structures, branch circuit connectors, insulating barriers, and filler plates for the cover opening which specifically arrange the breakers within segments consisting of a three-pole industrial frame circuit breaker space. A residential frame branch lighting circuit arrangement of up to six single-pole breakers may be incorporated in any segment along the panelboard, and by example could be disposed between segments containing industrial frame circuit breakers. Breakers of any frame size or pole size may be substituted within any segment as desired after initial installation of the panelboard by using different ones of the kits.

BRIEF DESCRIPTION OF THE DRAWINGS

FIG. 4 is a cross-sectional view taken along the line 4—4 of FIG. 2;

FIG. 5 is a cross-sectional view taken along the line 5—5 in FIG. 2; and

DESCRIPTION OF THE PREFERRED EMBODIMENTS

Figure 1:
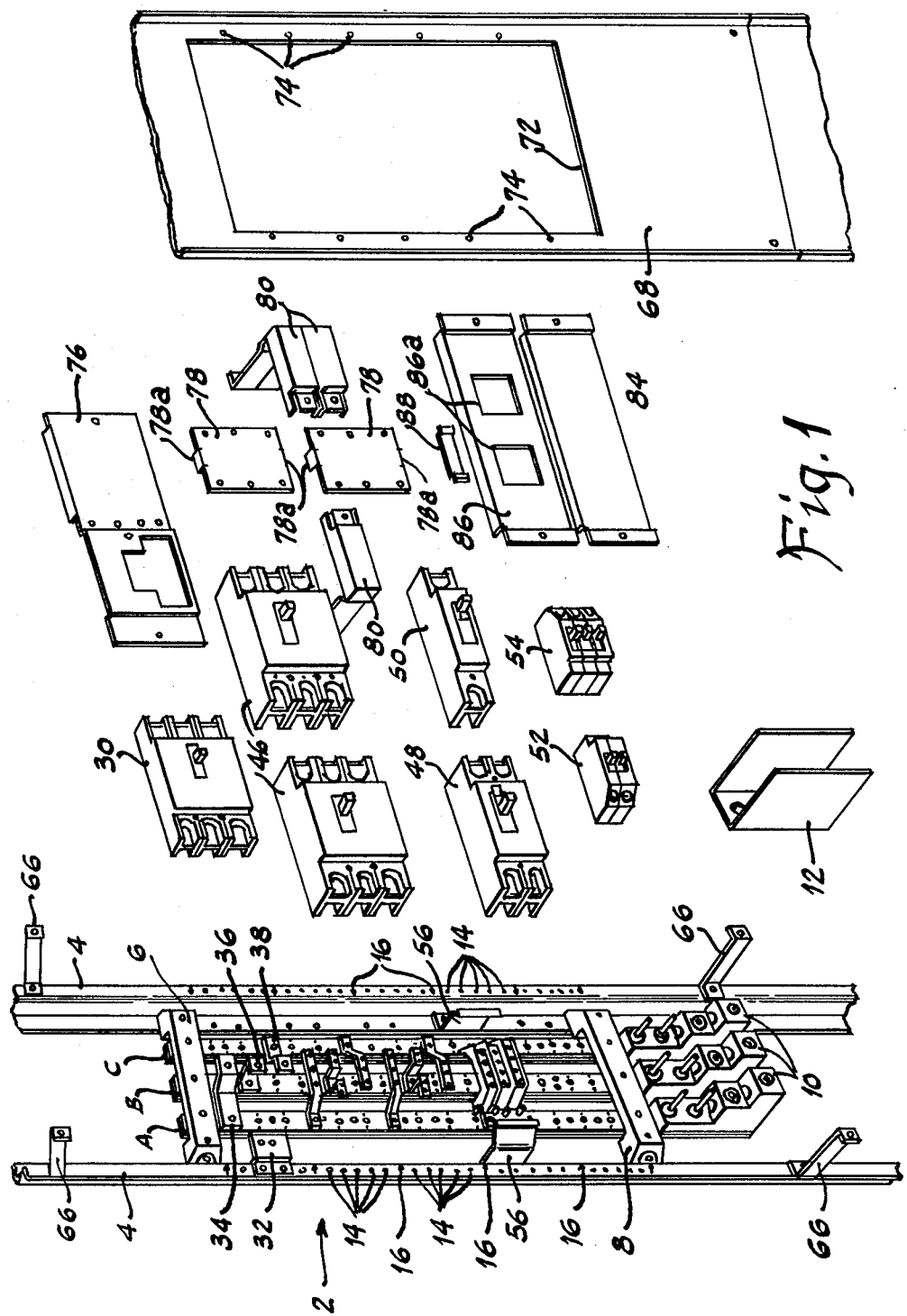
FIG. 1 is an exploded perspective view of the panelboard of this invention.

As seen in FIG. 1, the panelboard 2 comprises a pair of Z-shaped mounting rails 4 disposed in vertical parallel relationship by transversely mounted upper and lower bus support insulators 6 and 8, respectively. The bus support insulators 6 and 8 serve to mount vertically extending bus bars A, B, and C in a transversely spaced relationship between and parallel to the mounting rails 4. The bus bars A, B, and C may comprise plural thicknesses mounted in tandem to increase the current carrying capacity thereof, and in the panelboard shown in the drawings, three such thicknesses of bus bars are incorporated. The lower ends of the bus bars are individually provided with pressure connectors 10 for securing incoming service wires to the bus bars to provide electrical power to the panelboard. A U-shaped fiber insulator 12 is shown exploded from the panelboard assembly 2 in FIG. 1 and is inserted around the center pressure connector 10. The bight of insulator 12 is attached to the rear of the center bus bar B by screws or the like (not shown) and the legs thereof project forwardly between the center connector 10 and the adjacent outboard connectors 10 on bus bars A and C.

The mounting rails 4 are provided with a plurality of holes 14 which are arranged in repetitive series of five equally spaced holes in the vertical dimension of the mounting rail surface. Each series of holes 14 is separated by a distance greater than the spacing between adjacent holes 14 in the series to define a segment of the panelboard. To further define individual segments of the panelboard, arrows 16 are inscribed in the mounting rail in the center of the space between adjacent series of holes 14. The panelboard shown in the drawings has five such segments which are vertically contiguous and extend transversely across the width of the panelboard. The vertical dimension of each segment, i.e. the space along a mounting surface between adjacent arrows 16, is defined by the space required to accommodate a three-pole industrial frame circuit breaker.

The bus bars A, B, and C are provided with a plurality of holes along their length which are arranged in repetitive patterns to establish two sets of mounting holes within the transverse areas of the panelboard defined by the respective segments. With reference to the lower segment shown in FIG. 6, a first set of mounting holes consists of three rows of transversely aligned holes 18, 20, and 22. A second set of mounting holes within that segment consists of the center holes 20 in outboard bus bars A and C, transversely aligned holes 24 and 26 also in bus bars A and C, and holes 28 in center bus bar B.

Figure 6:
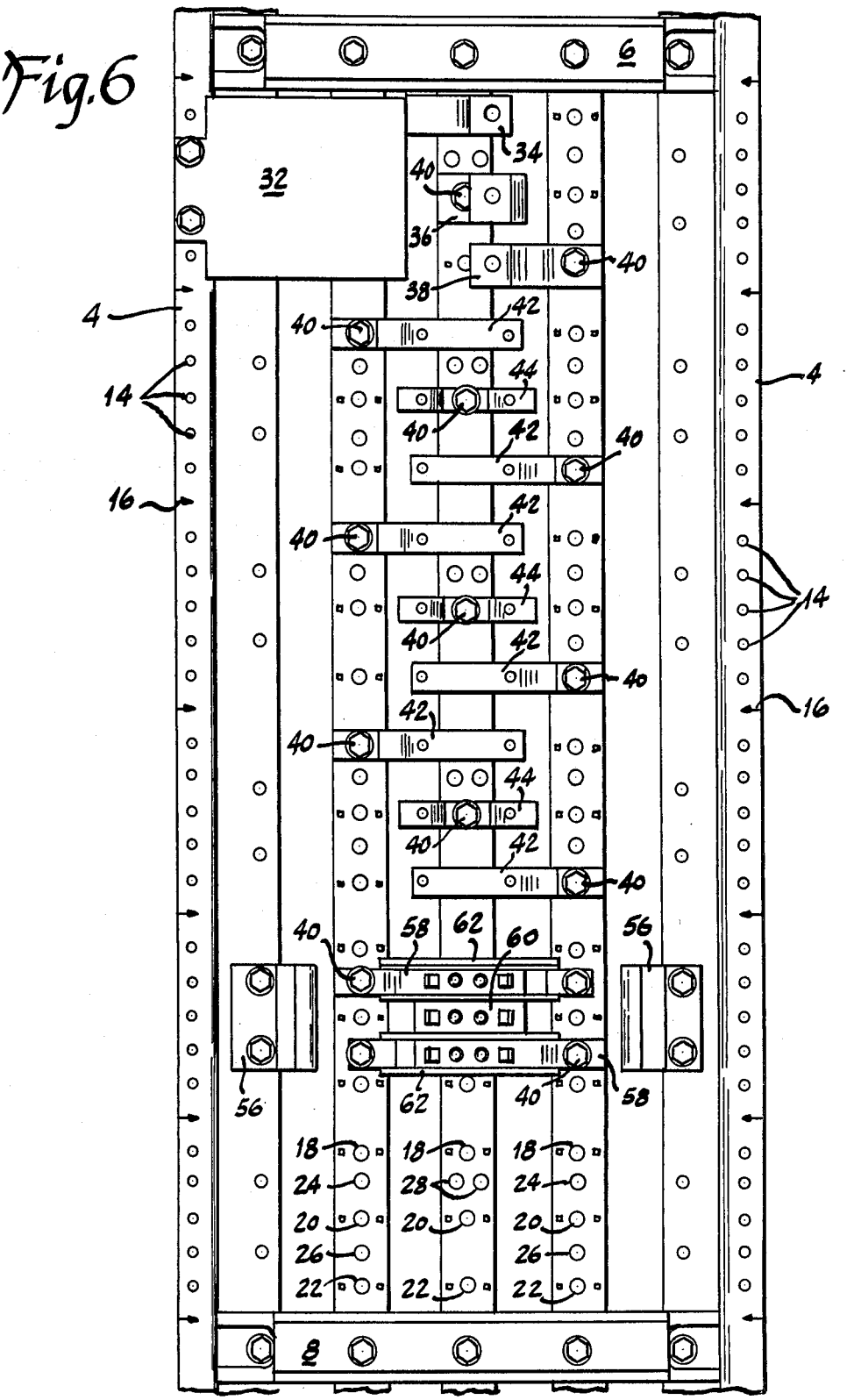
FIG. 6 is an enlarged front view of a portion of the panelboard of FIGS. 1 and 2.

The two sets of mounting holes in the bus bars within each segment of the panelboard, as described above permit a variety of branch circuit connectors to be attached to the bus bars to electrically connect circuit breakers of industrial frame or residential frame size within any segment. An exemplary arrangement has been illustrated in the drawings, it being understood that each segment may be modified to accept a different selection of circuit breakers as desired. Referring specifically to FIGS. 1 and 6, the first segment below the upper bus support insulator 6 is set up to receive an industrial frame circuit breaker 30 which may be on the order of a 225 amp max., 240 volt max. circuit breaker. The depth of circuit breaker 30 is shallower than the depth of other industrial frame circuit breakers shown on the drawing and to be described hereinafter, and for this reason an adapter bracket 32 is secured to the forward flange of left-hand mounting rail 4. Mounting bracket 32 is part of a kit for circuit breaker 30 which also includes branch circuit connectors 34, 36, and 38. Branch circuit connectors 34 and 38 are essentially Z-shaped members which are secured to the bus bars A and C, respectively, and project forwardly to overly the center bus bar B in forwardly spaced relationship thereto. Branch circuit connector 36 is essentially a U-shaped member which has one leg secured to the center bus bar B and which projects forwardly along a lateral edge of the center bus bar B such that its other leg presents a forward connector surface which is vertically aligned with the connector surfaces presented by companion branch circuit connectors 34 and 38. The branch circuit connectors 34, 36, and 38 are secured to the respective bus bars by screws 40 (FIG. 6) which pass through holes in the respective branch circuit connectors and threadably engage in holes 18 in bus bar A, 20 in bus bar B, and 22 in bus bar C, respectively. Circuit breaker 30 is mounted to the panelboard within the first segment to extend transversely across the panel board by connecting the line side terminals of the circuit breaker, which are on the right-hand side of the circuit breaker as viewed in FIG. 1, to the branch circuit connectors 34, 36, and 38 and is mounted at its left-hand, or outboard side by a pair of screws (not shown) which pass through holes in the circuit breaker housing to threadably engage in a pair of holes in the mounting bracket 32.

The second and third segments of the panelboard, immediately below the first segment, are set up to receive industrial frame circuit breakers of a lower ampere rating, but higher voltage rating than circuit breaker 30. The second and third segments each receive a pair of branch circuit connectors 42 and a branch circuit connector 44. The connectors 42 are identical and are reversed with respect to each other in their connections to bus bars A and C, respectively. The uppermost connector 42 in each segment is secured to the bus bar A by screw 40 which passes through a hole in the connector and engages the hole 18 in bus bar A in each segment. The lowermost connector 42 in each segment is secured to hole 22 in bus bar C by a screw 40. The center connector 44 is a U-shaped member having forwardly extending legs which terminate in outwardly extending wings at the forward ends of the legs and is connected to bus bar B by a screw 40 which passes through a hole in the bight portion of connector 44 and threadably engages in a hole 20 in bus bar B. The connectors 42 are offset forwardly to overlie the bus bar B in forward spaced relationship thereto to be in a common plane with the wings of center connector 44. Each of the forward portions of the connectors 42 and 44 have a pair of tapped holes therein which cooperate to provide two vertically extending rows of tapped holes located on opposite sides of the center bus bar B. A pair of industrial frame breakers 46 are mounted end-to-end to extend transversely across the panelboard within the second segment. The breakers 46 may, by example, be rated at 150 amp. max., 600 volt max., although, as will be described hereinafter, breakers so mounted connect to the same branch circuit connector and their combined current ratings must not exceed the rating of the branch circuit connector. Accordingly, if the branch circuit connectors are rated at 200 amp. max. each, breakers should be used which have combined ratings of 200 or less, such as two 100 amp. breakers, a 150 amp. breaker with a 50 amp. breaker, etc. The inboard ends of breakers 46 are physically and electrically mounted to the panel board by screws (not shown) which secure the line side terminals of these breakers to the branch circuit connectors 42 and 44 by means of the tapped holes in each of these connectors. The outboard ends of circuit breakers 46 are mounted directly upon the forward flange or mounting surface of the mounting rails 4 by one or more screws (not shown) which pass through suitable holes in the circuit breakers and threadably engage within respective aligned ones of the series of holes 14 in the mounting rails 4.

Figure 2:
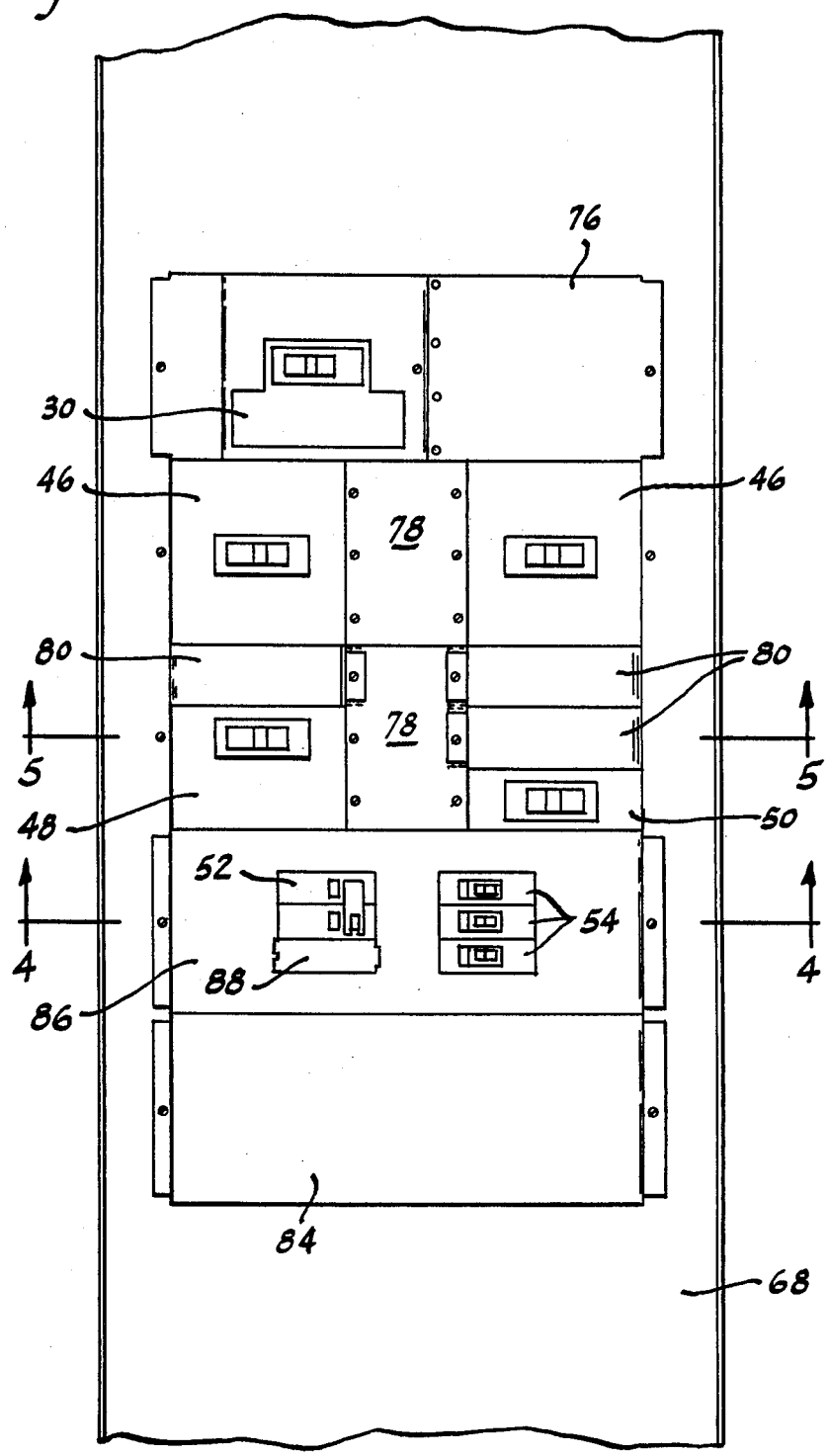
FIG. 2 is a front elevational view of the panelboard shown in FIG. 1.

The third segment receives, by way of example, a double-pole industrial frame circuit breaker 48 rated at 100 amp max., 480 volt max. and a single-pole industrial frame circuit breaker 50 rated at 100 amp max., 277 volt max. in an end-to-end relation to extend across the third segment. Circuit breaker 48 is mounted in the lower portion of the third segment and its right-hand, or inboard end is physically secured thereto by the electrical connection between its line side terminals and the center branch circuit connector 44 and lower branch circuit connector 42 within that segment. Thus the breaker 48 is electrically connected to the B and C bus bars. The left-hand, or outboard end of breaker 48 is mounted directly to the forward flange or mounting surface of left-hand mounting rail 44 by a screw (not shown) which passes through an opening in the circuit breaker and threadably engages with a respective aligned one of the holes 14 within that segment. The circuit breaker 50 is mounted on the right-hand side of the third segment and occupies the lowermost space within that segment. The inboard end of circuit breaker 50 is physically and electrically secured to the lowermost branch circuit connector 42 and the outboard, or right-hand end of circuit breaker 50 is mounted directly upon the forward flange of the right-hand mounting rail 4 by a screw and clamp (not shown) which extend along a side surface of the circuit breaker 50 and engage a respective aligned one of the mounting holes 14 in a manner well known in the art. With this exemplary arrangement, and referring additionally to FIG. 2, it can be seen that the third segment has a single pole unused space on the left-hand side of the panelboard and two unused single pole spaces on the right-hand side of the panelboard. The fourth segment of the panelboard is set up to receive residential frame circuit breakers which have a different, smaller pole width than the industrial frame breakers previously described. By way of example, a double-pole residential frame circuit breaker 52 may be mounted on the left-hand side of the panelboard and three single-pole residential frame circuit breakers 54 may be mounted on the right-hand side of the panelboard within the fourth segment. The breaker 52 may by example be rated at 125 amp max., 240 volt max. and the individual breakers 54 may be rated at 50 amp max., 120/240 volt although, as before, care must be taken that the combined current ratings for breakers mounted directly across from each other and therefore connected to the same branch circuit connector, do not exceed the maximum current rating for the branch circuit connector. To accommodate these breakers in the fourth segment, the mounting kit includes supplemental attachment means such as brackets 56 which are attached to the lower flange of each mounting rail 4, a pair of branch circuit connectors 58, a third branch circuit connector 60 and a pair of insulating barriers 62 (FIG. 6). The branch circuit connectors 58 are reversely oriented with respect to each other, the uppermost connector 58 being secured to the bus bar A by a screw 40 which passes through a hole in the connector and threadably engages hole 24 in bus bar A within the fourth segment. The lowermost connector 58 is secured to the bus bar C by a screw 40 which engages hole 26 within the fourth segment. Referring also to FIG. 4, the barriers 62 are molded of insulating material and rest upon the inboard corners of bus bars A and C. The barriers 62 bridge the center bus bar in spaced relation thereto and further have forwardly projecting ribs extending transversely of the panelboard along each edge to receive the respective branch circuit connector 58 between said ribs. The branch circuit connectors 58 are offset forwardly and overlie the bottom wall of each barrier to hold the barrier in place upon the bus bars A and C and the engagement of the lateral edges of the branch circuit connectors 58 with the inner sides of the forwardly projecting ribs of the barriers 62 serve to position the barriers vertically on the panelboard. The two barriers 62 are thus spaced apart leaving a central opening therebetween and the center branch circuit connector 60 is mounted to occupy this space. Connector 60 is a Z-shaped bracket which is mounted transversely of the center bus bar B by a pair of screws 40 which pass through clearance holes in the lower leg of bracket 60 and engage holes 28 in bus bar B within the fourth segment. The upper, or forward leg of Z-shaped bracket 60 occupies a common plane with the forward portions of connectors 58. The forward surfaces of connectors 58 and 60 are each provided with plug-in and bolt-on connector means for receiving residential frame circuit breakers of either type as is disclosed in U.S. patent application Ser. No. 233,357 filed May 2, 1979 and allowed Aug. 14, 1981 in the name of Howard E. Koslosky, et. al., and assigned to the assignee of this application. The connector elements are disposed in two vertically aligned rows spaced on opposite sides of the center plane of the panelboard to permit attachment of the line side terminals of the residential frame circuit breakers 52 and 54 thereto. In the embodiment illustrated by FIG. 4, the residential frame circuit breakers 52 and 54 are of the plug-in type and their outboard ends are secured to brackets 56 by hooks 64 on the circuit breakers. Also in FIG. 4 it can be seen that the web of Z-shaped connector 60 intermediate the upper and lower legs thereof is provided with a central opening 60a therein for reasons which will be described hereinafter. The fifth segment of the panelboard has been left totally vacant to facilitate illustration of the invention, and may be left vacant for future expansion of the electrical service in a typical installation.

The mounting rails 4 are further provided with four forwardly projecting Z-shaped brackets 66 mounted vertically beyond the upper and lower bus support insulators 6 and 8, respectively, to receive a dead front cover 68 for the panelboard 2. The dead front cover 68 is secured to the brackets 66 by suitable fasteners such as thread cutting screws 70 or the like shown in FIGS. 4 and 5. The dead front cover 68 is provided with a large rectangular opening 72 essentially corresponding to the boundary dimensions of the five segments of the panelboard. The cover 68 is also provided with holes 74 along the margin of each vertical edge of the opening 72 which are vertically spaced to be located in the center of each segment.

A plurality of filler plates are provided to close off the cover opening 72 for each segment. A filler plate 76 is provided for use in conjunction with breaker 30. Filler plate 76 has a vertical dimension which corresponds to the vertical dimension of a segment. It will be noted from viewing FIG. 2 that circuit breaker 30 is mounted to be offset toward the center of the panel board to attain the required bending space for the wires used in conjunction with this 225 amp circuit breaker. It is also necessary to offset the filler plate 76 forwardly in the area which overlies the handle of circuit breaker 30 due to a difference in configuration of this breaker with respect to the other industrial frame breakers 46, 48, and 50. Filler plate 76 is attached directly to the dead front cover 68 by a pair of screws (not shown) which pass through clearance openings in the filler plate and take into aligned ones of the holes 74 in cover 68. In the second segment, a pair of three-pole industrial frame circuit breakers 46 are mounted end to end to completely occupy this segment. A filler plate 78 is provided for use in this situation. Plate 78 is a flat rectangular plate having a pair of tabs 78a formed over at its upper and lower edges to project rearwardly between the two breakers 46. Plate 78 has a series of three holes formed along each of its vertical edges and is positioned on the two circuit breakers 46 to extend therebetween. The plate 78 may be suitably secured to the breakers 46 by a pair of screws extending through the central clearance hole on each respective side of the plate which take into apertures formed in the circuit breaker housings. The same plate 78 is used in conjunction with industrial frame circuit breakers of less than three poles such as are mounted in the third segment of the panelboard. The plate 78 again is mounted to the breakers 48 and 50 in the space therebetween by suitable screws (not shown) which pass through respective ones of the clearance holes in the plate 78 and take into suitable apertures formed in the housings of the breakers. To close off the individual vacant single-pole spaces for the industrial frame breakers such as is found in the third segment of the panelboard, a single-pole filler member 80 is provided which has a vertical dimension equal to the width of a single-pole breaker. The inboard end of member 80 is formed to provide a resilient finger having a rearwardly projecting dimple to provide a snap-fit engagement with the plate 78 and an associated one of the clearance holes therein. The other end of member 80 is provided with a rearwardly extending leg which mounts to the forward flange of the respective mounting rail 4 by a thread cutting screw 82 or the like as may be seen in FIG. 5. The members 80 may be used in combinations of 1, 2 or 3 per side as is required, so long as at least one circuit breaker is provided in that segment to support the plate 78. In the event that no breaker is mounted in the segment, such as is the case in the fifth segment of this panelboard, a filler plate 84 is provided which spans the entire opening 72 of the cover 68 within a given segment and is secured to the cover by screws (not shown) which pass through holes in the plate 84 and take into aligned ones of the holes 74 in cover 68. A filler plate 86 is provided for use in conjunction with residential frame circuit breakers such as 52 and 54 located in the fourth segment. Filler 86 is identical in its overall dimensions to the plate 84 and therefore occupies the complete segment opening in cover 68. The plate 86 is provided with a pair of rectangular openings 86a which permit the forward surfaces of the circuit breakers 52 and 54 to project therethrough. A separate molded filler plate 88 is provided for closing off unused pole spaces for the residential frame circuit breaker, the filler plate 88 being molded out of plastic material and engaging the sides of the opening 86a with a snap fit. Filler plate 88 is of a type which is well known in the residential frame panelboard art and the details thereof have not been shown in the drawings for this invention.

Referring again to FIGS. 4 and 5, a vertically extending passageway is created forward of the center bus bar B. Adjacent industrial frame breakers in any segment are mounted to be spaced apart by an amount essentially equal to the tab 78a of filler plate 78. Moreover the forward projection of the respective branch circuit connectors and the mounting rails or their auxiliary attachment means such as brackets 32 and the forward projection of the connectors 58 for the residential frame circuit breakers and their associated brackets 56 cause the respective breakers to be mounted forwardly of the center bus bar B. The U-shaped center branch circuit connectors 36 and 44 provide an open space immediately forward of the center bus bar B. The raised bridging insulators 62 and the center aperture 60a in residential frame center branch circuit connector 60 also cooperate to provide an opening over the B bus bar. The structural details of these branch circuit connectors and insulating barriers cooperate to form aligned openings which establish a vertical chimney forwardly of the center bus bar and extending centrally and vertically of the panelboard 2 to direct heat generated by the various circuit breakers in operation upwardly to be exhausted at the top of the panelboard 2.

Figure 3:
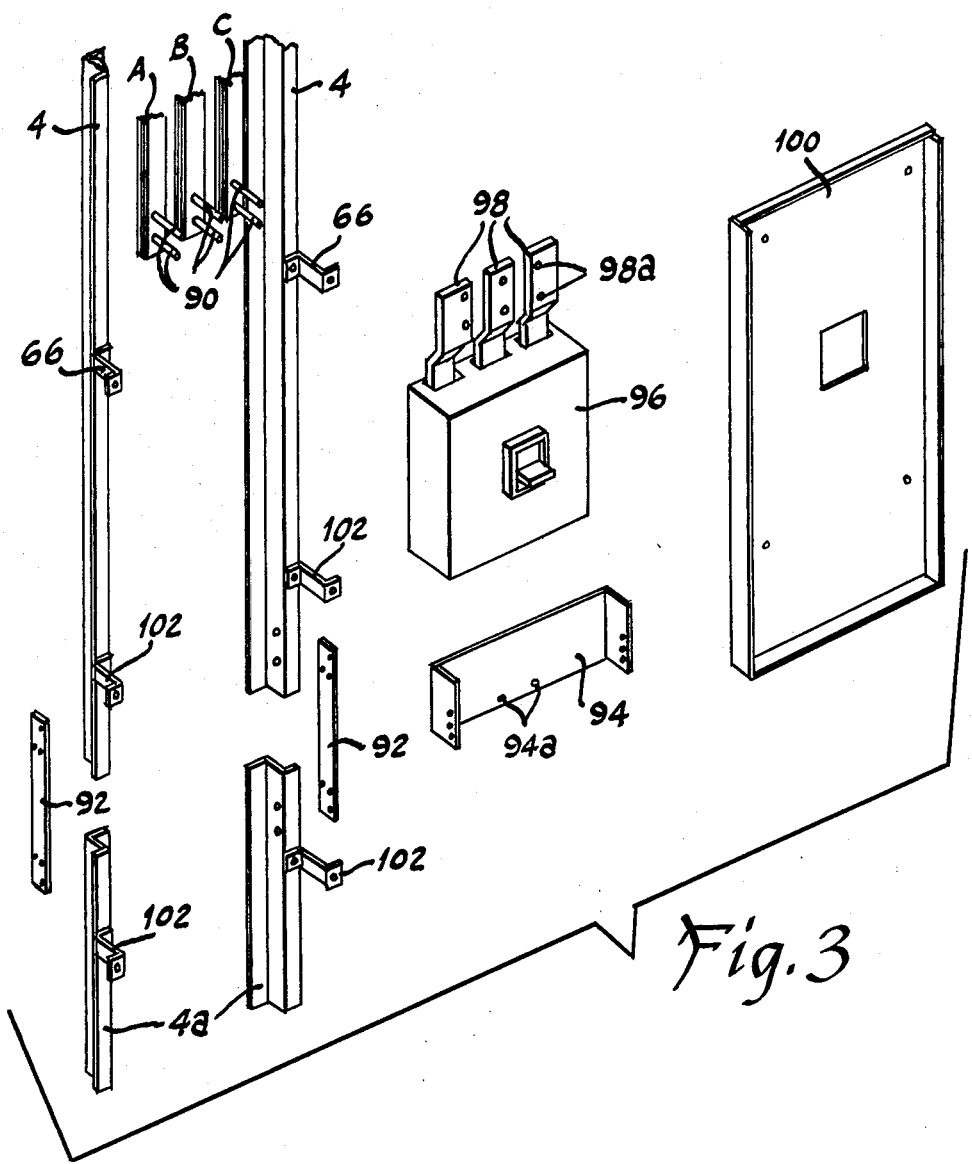
FIG. 3 is an exploded perspective view of a main breaker add on kit which may be incorporated in the panelboard of FIGS. 1 and 2.

In FIG. 3 there is shown a main breaker kit which may be stocked by a distributor and adapted to the panelboard 2 in lieu of the pressure connectors 10 attached to the lower ends of the bus bars A, B, and C. These connectors 10 are removed by disassembling the nuts which hold the connectors onto the bus bars, leaving the forwardly projecting screws 90 in place. The kit comprises extensions 4a of the Z-shaped mounting rails 4 which are secured to the mounting rails 4 by connector straps 92 attached to the intermediate web portion of the mounting rails 4 by means of screws (not shown). A transverse saddle 94 comprising a metal U-shaped bracket is secured between the mounting rails 4 by the same screws which attach the connector straps 92 thereto and serves as a seat for the main circuit breaker 96. The latter is mounted to this saddle by pairs of screws (not shown) which pass through clearance openings in the housing of the circuit breaker and take into holes 94a the metal strap 94. The breaker is provided with upwardly projecting and forwardly offset terminals 98 which each have pairs of openings 98a therein corresponding to the screws 90 projecting from the lower ends of the bus bars A, B, and C. The nuts are then reassembled to the screws 90 and tightened down to complete the electrical connection between the bus bars and the respective terminals of the main circuit breaker 96. The main circuit breaker kit has its own cover 100 which is mounted on Z-shaped brackets 102 secured to the mounting rails 4 and to the extension mounting rails 4a.

The invention as described herein is applied to a three phase panelboard having the three bus bars A, B, and C. The invention may be applied equally as well to a single phase panelboard having only two bus bars, for example bars A and C and omitting the center bus bar B and its associated branch circuit connectors. Accordingly, each segment for a single phase panelboard contains only two branch circuit connectors, one from bus bar A and one from bus bar C and thus each segment has a vertical dimension equal to two industrial frame breaker pole spaces. The number of mounting holes in the bus bars and in the mounting surfaces of rails 4 is correspondingly reduced.

The invention as hereinabove described provides a panelboard which may accept in an ordered segmented arrangement various combinations of industrial frame circuit breakers and residential frame circuit breakers in any desired arrangement. The panelboard arrangement may be revised after the device is installed in the field and any segment may be utilized for combinations of breakers of the aforedisclosed type. While the panelboard in the embodiment disclosed herein provides structurally distinct mounting rail members, it is to be understood that the invention may be applied to panelboards having the mounting rails, or mounting surfaces, formed from a sheet metal pan of the like common to both mounting surfaces, and that other features of the invention disclosed herein are similarly susceptible of various modifications without departing from the scope of the appended claims.

We claim:

1. An electrical panelboard assembly receiving industrial frame and residential frame circuit breakers, said industrial frame circuit breakers having a pole-to-pole spacing that is unequal to the pole-to-pole spacing or multiples thereof for said residential frame circuit breakers, said panelboard assembly comprising, in combination:

a pair of parallel, transversely spaced mounting surfaces;

spaced insulating bus support members disposed between said mounting surfaces;

a plurality of electrically conductive bus bars supported by said insulating bus support members in transversely spaced relation between said mounting surfaces and extending parallel to said mounting surfaces;

means defining a plurality of equal contiguous segments for said panelboard along the length of said mounting surfaces, said segments extending transversely of said panelboard; and means selectively mounting either industrial frame or residential frame circuit breakers in any one of said segments comprising first and second sets of mounting means on said bus bars in each of said segments and attaching branch circuit connectors to said bus bars, said first set of mounting means being spaced along the lengthwise direction of said bus bars at first intervals corresponding to the pole-to-pole spacing of said industrial frame circuit breakers and mounting a first set of branch circuit connectors which electrically connect industrial frame circuit breakers to said panelboard, and said second set of mounting means being spaced along the lengthwise direction of said bus bars at second intervals unequal to said first intervals and corresponding to the pole-to-pole spacing of said residential frame circuit breakers and mounting a second set of branch circuit connectors which electrically connect residential frame circuit breakers to said panelboard, said bus bars having only one set of said first and second sets of said branch circuit connectors mounted thereto within any segment.

2. The invention as defined in claim 1 wherein each segment is defined by the dimension in the lengthwise direction of said bus bars of a three-pole industrial frame circuit breaker.

3. The invention as defined in claim 1 wherein means are provided on said mounting surfaces for indicating the boundaries of said segments.

4. The invention as defined in claim 3 wherein said indicating means comprises repetitive series of mounting holes in said mounting surfaces, each of said series comprising a plurality of identical equally spaced holes positioned within a segment, the end holes of adjacent ones of said series being spaced apart a greater distance than the distance between adjacent holes within each series.

5. The invention as defined in claim 1 wherein said branch circuit connectors have apertures therein and said mounting means comprise threaded fastener means which are accessible to the front of said panelboard and extend through said apertures in said branch circuit connectors for selectively attaching said branch circuit connectors to said bus bars.

6. The invention as defined in claim 5 wherein said mounting means comprises apertures in said bus bars and said threaded fastening means are insertible from the front of said panelboard to project through said apertures in said branch circuit connectors and to threadably engage said apertures in said bus bars.

7. The invention as defined in claim 1 wherein each segment is defined by the dimension in the lengthwise direction of said bus bars of a two-pole industrial frame circuit breaker.

8. An electrical panelboard assembly receiving industrial frame and residential frame circuit breakers, said industrial frame circuit breakers having a pole-to-pole spacing that is unequal to the pole-to-pole spacing or multiples thereof for said residential frame circuit breakers, said panelboard assembly comprising, in combination:
   a pair of spaced, parallel, vertically extending mounting rails;
   upper and lower insulating bus support means attached to said mounting rails and extending transversely therebetween;
   a plurality of electrically conductive bus bars supported by said upper and lower insulating bus support means, said bus bars extending parallel to said mounting rails and being transversely spaced therebetween;
   means defining a plurality of vertically equal contiguous segments for said panelboard between said upper and lower insulating bus support means, said segments extending transversely of said panelboard;
   means selectively mounting either industrial frame or residential frame circuit breakers in any one of said segments comprising first and second sets of mounting means on said bus bars in each of said segments and attaching branch circuit connectors to said bus bars, said first set of mounting means being spaced vertically at first intervals corresponding to the pole-to-pole spacing of said industrial frame circuit breakers and mounting a first set of branch circuit connectors which electrically connect industrial frame circuit breakers to said panelboard, and said second set of mounting means being spaced vertically at second intervals unequal to said first intervals and corresponding to the pole-to-pole spacing of said residential frame circuit breakers and mounting a second set of branch circuit connectors which electrically connect residential frame circuit breakers to said panelboard, said bus bars having only one of said first and second sets of said branch circuit connectors mounted thereto within any segment;
   said circuit breakers mounted on said panelboard within said segments to extend transversely of said panelboard;
   attachment means securing the outboard ends of said circuit breakers to said mounting rails, the inboard ends of said circuit breakers being secured by connections thereof with respective branch circuit connectors, said attachment means and said respective branch circuit connectors cooperating to mount said circuit breakers such that their forward surfaces are disposed in a common vertical plane;
   cover means supported from said mounting rails and spaced forwardly thereof for overlying portions of said circuit breakers, said cover means having a single opening therein corresponding to the total contiguous segments and through which said forward surfaces of said circuit breakers project; and
   a plurality of supplemental cover means corresponding to said segments and portions of said segments for selectively closing off portions of said opening in said cover means.

9. The invention as defined in claim 8 wherein each segment is defined by the vertical dimension along said mounting rails of a three-pole industrial frame circuit breaker.

10. The invention as defined in claim 8 wherein said attachment means for securing the outboard ends of said circuit breakers to said mounting rails comprises holes in said mounting rails and said means defining said segments comprises repetitive series of said last mentioned holes, each series being spaced apart a greater distance than the distance between adjacent holes in each series.

11. The invention as defined in claim 10 wherein:
   said attachment means further comprise brackets secured to said mounting rails and projecting forwardly thereof;
   said branch circuit connectors for connecting industrial frame circuit breakers are offset forwardly, respective ones of said last mentioned connectors which are mounted to outer ones of said bus bars extending transversely to overlie a central one of said bus bars in forwardly spaced relation thereto and another of said last mentioned connectors which is mounted to a central one of said bus bars being U-shaped to project forwardly along lateral edges of said central bus bar;
   said branch circuit connectors for connecting residential frame circuit breakers are offset forwardly, respective ones of said residential frame branch circuit connectors which are mounted to outer ones of said bus bars extending transversely to overlie said central bus bar in forwardly spaced relation thereto and another of said residential frame branch circuit connectors which is mounted to said central bus bar comprising a Z-shaped member mounted transversely of said central bus bar, said Z-shaped member having an aperture through the forwardly projecting leg;

said attachment means and the respective branch circuit connectors cooperating to mount said circuit breakers in forwardly spaced relation to said bus bars; and said U-shaped branch circuit connector and said aperture in said Z-shaped member being vertically aligned to provide a vertically extending central passageway on said panelboard for exhausting heat to the upper end of said panelboard.

12. The invention as defined in claim 8 wherein means are provided on said mounting rails for indicating the boundaries of said segments.

13. The invention as defined in claim 8 wherein said branch circuit connectors have apertures therein and said mounting means comprise threaded fastener means which are accessible to the front of said panelboard and extend through said apertures in said branch circuit connectors for selectively attaching said branch circuit connectors to said bus bars.

14. The invention as defined in claim 13 wherein said mounting means comprises apertures in said bus bars and said threaded fastening means are insertible from the front of said panelboard to project through said apertures in said branch circuit connectors and to threadably engage said apertures in said bus bars.

15. The invention as defined in claim 8 wherein said supplemental cover means comprise plates secured to said cover at opposite sides of said single opening to extend across said opening.

16. The invention as defined in claim 15 wherein said plates are provided with openings through which said forward surfaces of said circuit breakers project.

17. The invention as defined in claim 8 wherein said supplemental covers means comprise plates secured to portions of industrial frame circuit breakers mounted in the same segment, said plate extending between said circuit breakers.

18. The invention as defined in claim 17 wherein one of said industrial frame circuit breakers mounted in the same segment has fewer than three poles, and said supplemental cover means further comprises a single-pole width filler strip having a rearwardly extending leg at one end attached to a respective mounting rail and a clip portion at its other end engaging said plate with a snap fit.

19. The invention as defined in claim 8 wherein each segment is defined by the vertical dimension along said mounting rails of a two-pole industrial frame circuit breaker.

* * * * *